US012337861B2

(12) United States Patent
Yamada et al.

(10) Patent No.: US 12,337,861 B2
(45) Date of Patent: Jun. 24, 2025

(54) INTER-VEHICLE DISTANCE SHARING DEVICE, INTER-VEHICLE DISTANCE SHARING METHOD, AND NON-TRANSITORY STORAGE MEDIUM

(71) Applicant: TOYOTA JIDOSHA KABUSHIKI KAISHA, Aichi-ken (JP)

(72) Inventors: Masahiro Yamada, Toyota (JP); Tetsuo Hayakawa, Miyagi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/498,034

(22) Filed: Oct. 31, 2023

(65) Prior Publication Data
US 2024/0208524 A1    Jun. 27, 2024

(30) Foreign Application Priority Data
Dec. 23, 2022    (JP) .................................. 2022-206845

(51) Int. Cl.
*B60W 50/14*    (2020.01)
*B60K 35/00*    (2024.01)
*B60K 35/28*    (2024.01)

(52) U.S. Cl.
CPC ............ *B60W 50/14* (2013.01); *B60K 35/00* (2013.01); *B60K 35/28* (2024.01); *B60K 2360/179* (2024.01); *B60W 2050/146* (2013.01); *B60W 2554/80* (2020.02)

(58) Field of Classification Search
CPC ........... B60W 50/14; B60W 2050/146; B60W 2554/80; B60W 2554/802; B60W 2756/10; B60K 35/00; B60K 35/28; B60K 2360/179; G01C 21/26; G08G 1/0967; G08G 1/096791; G08G 1/166
See application file for complete search history.

(56) References Cited

U.S. PATENT DOCUMENTS

| 2008/0070593 | A1* | 3/2008  | Altman ................ | H04W 4/029 455/457 |
| 2010/0325194 | A1* | 12/2010 | Williamson .......... | H04W 4/029 709/203 |
| 2015/0371458 | A1* | 12/2015 | Scott .................... | G07C 5/0808 701/1 |
| 2016/0105768 | A1* | 4/2016  | Pinard .................. | G09B 29/007 455/457 |
| 2023/0325958 | A1* | 10/2023 | Miyata .................. | G06Q 10/08 705/7.21 |

FOREIGN PATENT DOCUMENTS

JP    2011-210250 A    10/2011

* cited by examiner

*Primary Examiner* — Omeed Alizada
(74) *Attorney, Agent, or Firm* — HAUPTMAN HAM, LLP (57) ABSTRACT

An inter-vehicle distance sharing device includes a memory and a processor coupled to the memory. The processor coupled to the memory, the processor being configured to register, in advance, vehicles that share position information and a common registration point of each of the vehicles, and display, at a display unit installed at the vehicle of a specific member, a distance from each of the vehicles registered in advance to the common registration point.

5 Claims, 8 Drawing Sheets

| REGISTERED PARTIES: LIST OF DISTANCE TO HOME FROM CURRENT POSITION | | |
|---|---|---|
| ●●ELDEST SON | ⓘ | 55m |
| ●●WIFE | ⓘ | 4.1km |
| ●●ELDEST DAUGHTER | ⓘ | 4.1km |
| ●●FATHER | ⓘ | 35km |

NARROW DOWN | DON'T NARROW DOWN

INTER-VEHICLE DISTANCE SHARING DEVICE, INTER-VEHICLE DISTANCE SHARING METHOD, AND NON-TRANSITORY STORAGE MEDIUM

CROSS-REFERENCE TO RELATED APPLICATION

This application is based on and claims priority under 35 USC 119 from Japanese Patent Application No. 2022-206845 filed on Dec. 23, 2022, the disclosure of which is incorporated by reference herein.

BACKGROUND

Technical Field

The present disclosure relates to an inter-vehicle distance sharing device, an inter-vehicle distance sharing method, and a non-transitory storage medium.

Related Art

For example, Japanese Patent Application Laid-Open (JP-A) No. 2011-210250 discloses a safe driving assistance system in which a roadside unit (RSU) intermittently transmits a radio signal, including at least a report signal, to a mobile station within the area, the mobile station receives the radio signal and reproduces at least traffic control information included in report information, the relative distance between the RSU and a nearby mobile station and the direction of location are measured and a relative position determined, and traffic control information, relative positioning between the RSU and a nearby mobile station, a warning of detected danger, or a combination thereof, are displayed at a screen as required.

For example, when performing parallel parking of plural cars in a parking space at a home, in cases in which there is a vehicle that is parked later, the vehicles need to be switched around when going out again.

In such cases, if the distance from the vehicle that will be parked later to the home is known, a driving plan can be formulated in order to avoid switching the vehicles around.

However, in the technology disclosed in JP-A No. 2011-210250, although the distance between vehicles traveling concurrently is known, since the distance to a remote vehicle is not known, there is room for improvement in terms of sharing the positions of the vehicles and developing a driving plan.

SUMMARY

The present disclosure provides an inter-vehicle distance sharing device, an inter-vehicle distance sharing method, and a non-transitory storage medium that are capable of sharing positions of vehicles and formulating a driving plan.

An inter-vehicle distance sharing device according to a first aspect includes a registration unit that registers, in advance, vehicles that share position information and a common registration point of each of the vehicles; and a control unit that performs control to display, at a display unit installed at the vehicle of a specific member, a distance from each of the vehicles registered in advance by the registration unit to the common registration point.

According to the first aspect, since the distance to the common registration point for each registered vehicle is displayed on a display unit installed in the vehicle of a specific member, it is possible to share the positions of the vehicles and formulate a driving plan.

An inter-vehicle distance sharing device according to a second aspect is the inter-vehicle distance sharing device of the first aspect, in which the control unit performs control to display the distance at the display unit with a different display format for a case in which the vehicles are in motion and the distance changes, and for a case in which the vehicles are stationary and there is no change in the distance.

According to the second aspect, together with the distance from the registered vehicles to the common registration point, it is possible to check whether or not the registered vehicles are moving.

An inter-vehicle distance sharing device according to a third aspect is the inter-vehicle distance sharing device of the first aspect or the second aspect, in which the control unit performs control to further display, at a display unit, an estimated arrival time in a case in which the vehicle has set the common registration point as a destination.

According to the third aspect, the estimated arrival time can be checked as well as the distance from the registered vehicles to the common registration point.

An inter-vehicle distance sharing system according to a fourth aspect performs processing including: registering, in advance, vehicles that share position information and a common registration point of each of the vehicles; and displaying, at a display unit installed at the vehicle of a specific member, a distance from each of the vehicles registered in advance to the common registration point.

According to the fourth aspect, an inter-vehicle distance sharing method that makes it possible to share the positions of the vehicles and formulate a driving plan can be provided.

A non-transitory storage medium storing an inter-vehicle distance sharing program according to a fifth aspect causes a computer to perform processing including registering, in advance, vehicles that share position information and a common registration point of each of the vehicles; and displaying, at a display unit installed at the vehicle of a specific member, a distance from each of the vehicles registered in advance to the common registration point.

According to the fifth aspect, a non-transitory storage medium storing an inter-vehicle distance sharing program that makes it possible to share the positions of the vehicles and formulate a driving plan can be provided.

As described above, according to the present disclosure, an inter-vehicle distance sharing device, an inter-vehicle distance sharing method, and a non-transitory storage medium that are capable of sharing positions of vehicles and formulating a driving plan, can be provided.

BRIEF DESCRIPTION OF THE DRAWINGS

Exemplary embodiments of the present invention will be described in detail based on the following figures, wherein.

DETAILED DESCRIPTION

Figure 1:
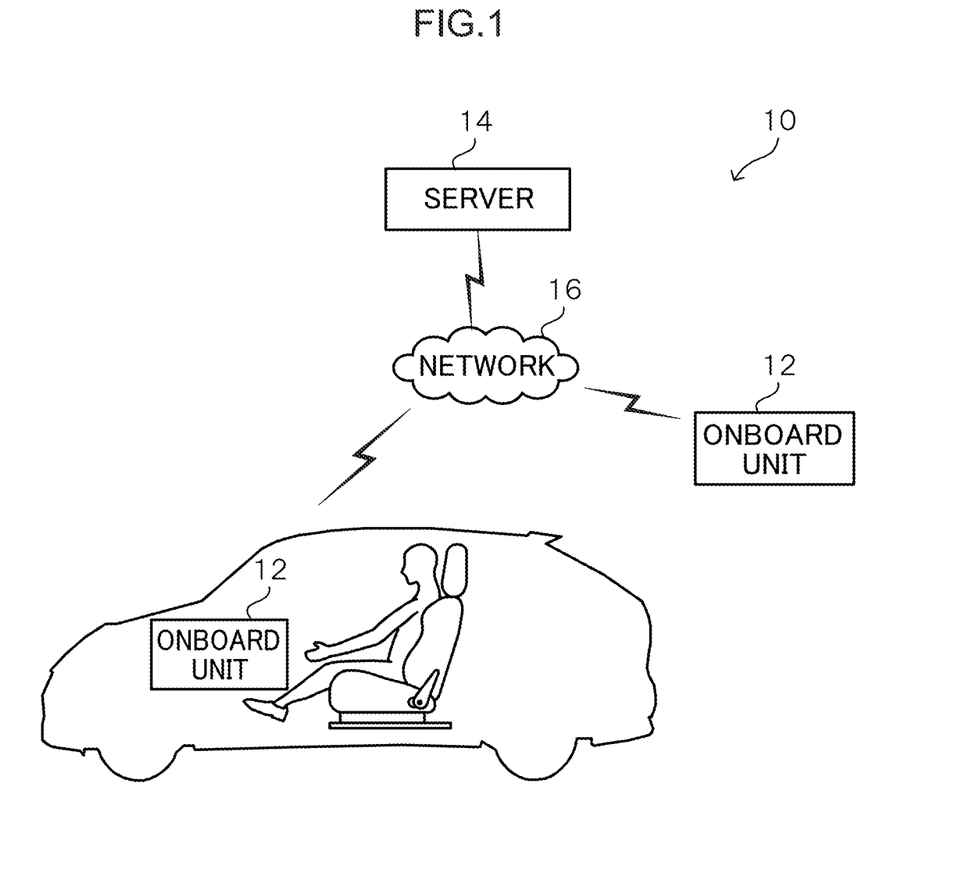
FIG. 1 is a diagram illustrating a schematic configuration of an inter-vehicle distance sharing system according to the present embodiment.
Figure 2:
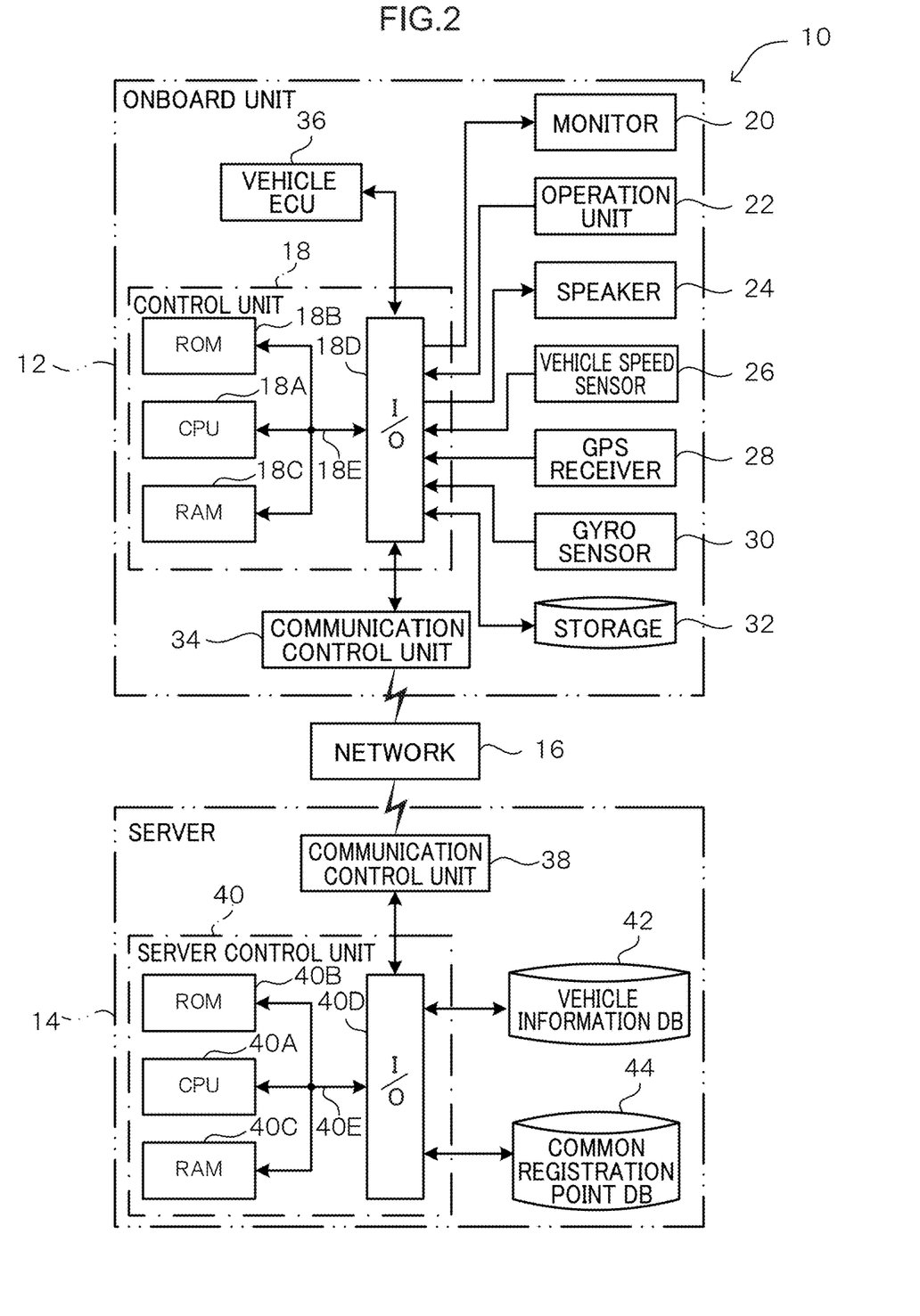
FIG. 2 is a block diagram illustrating a specific configuration example of an inter-vehicle distance sharing system according to the present embodiment.

In the following, an exemplary embodiment of the present disclosure is explained in detail with reference to the drawings. FIG. 1 is a diagram illustrating a schematic configuration of an inter-vehicle distance sharing system according to the present embodiment. FIG. 2 is a block diagram illustrating a specific configuration example of the inter-vehicle distance sharing system according to the present embodiment.

As illustrated in FIG. 1, an inter-vehicle distance sharing system 10 according to the present exemplary embodiment is a server network system in which an onboard unit 12 installed at a vehicle and a server 14 serving as an example of an inter-vehicle distance sharing device are connected to a network 16. Note that although FIG. 1 illustrates only two onboard units 12, there is no limitation thereto, and three or more onboard units 12 can be connected to the network 16.

As shown in FIG. 2, the onboard unit 12 includes a control unit 18 configured by a computer in which a central processing unit (CPU) 18A, read only memory (ROM) 18B, random access memory (RAM) 18C, and an input/output interface (I/O) 18D are connected to a bus 18E.

The ROM 18B stores a program for providing guidance along a route to a destination, a program to display a distance from a pre-registered vehicle to a pre-registered common registration point, and a position, and the like. By expanding the program stored in the ROM 18B in the RAM 18C and executing the program by the CPU 18A, control to provide guidance along a route to a destination, and display of the distance from a pre-registered vehicle to a pre-registered common registration point and of a position, are performed.

A monitor 20 as an example of a display unit, an operation unit 22, a speaker 24, a vehicle speed sensor 26, a global positioning system (GPS) receiver 28, a gyro sensor 30, a storage 32, a communication control unit 34, and a vehicle ECU 36 are connected to the I/O 18D. Note that the connection between the I/O 18D and the respective units may be implemented via an onboard network such as a controller area network (CAN).

The monitor 20 is provided on a center console or the like inside the vehicle cabin, and displays a map, various information, and the like for guidance along a route to a set destination.

The operation unit 22 includes a touch panel, switches, and the like for inputting destination settings, various information, and the like. The operation unit 22 is operated to enable registration of a home point, setting of a destination, instructing re-searching of a route, setting of position sharing between vehicles, setting of a common registration point, and the like. The operation unit 22 is also capable, for example, of instructing display of a distance from a pre-registered vehicle to a pre-registered common registration point.

The speaker 24 generates sounds such as speech and audio for route guidance to a set destination.

The vehicle speed sensor 26 detects a travel speed of the vehicle (hereafter, referred to as vehicle speed), and outputs the detection result to the control unit 18.

The GPS receiver 28 receives a GPS signal including time information from a GPS satellite, and outputs the received result to the control unit 18. Accordingly, the control unit 18 can measure the vehicle position based on plural GPS signals to obtain vehicle position information.

The gyro sensor 30 detects acceleration, angular acceleration, angular velocity, and the like, and outputs the detection result to the control unit 18. This enables the control unit 18 to detect the vehicle attitude based on the detection result of the gyro sensor 30.

The storage 32 stores various information such as map information to perform route guidance to a set destination. The control unit 18 performs route guidance to the set destination based on the map information stored in the storage 32.

The communication control unit 34 communicates with the server 14 by communicating with the network 16 through wireless communication using, for example, a cellular phone network or the like.

The vehicle ECU 36 performs various controls inside the vehicle, including engine control and air conditioning control. Moreover, the vehicle ECU 36 stores information including, for example, vehicle type information for a vehicle installed with the onboard unit 12. In the present exemplary embodiment, the control unit 18 is able to acquire vehicle type information and the like from the vehicle ECU 36.

The server 14 includes a server control unit 40 configured by a computer including a CPU 40A, a ROM 40B, a RAM 40C, and an I/O (input/output interface) 40D connected to a bus 40E.

In the ROM 40B on the server 14 side, a program for acquiring position information from a pre-registered onboard unit 12, a program that transmits position information of a vehicle registered in advance, or a distance from a vehicle registered in advance to a common registration point registered in advance, to the onboard unit 12 in response to a request, or the like, is stored. For example, the CPU 40A, serving as a processor, expands and executes a program stored in the ROM 40B, serving as memory, in the RAM 40C, whereby, in response to a request from the onboard unit 12, pre-registered vehicle position information, or a distance from the pre-registered vehicle to a pre-registered common registration point, are transmitted to the onboard unit 12, and control to effect display thereof on the monitor 20 of the onboard unit 12 and the like are performed.

The I/O 40D is connected to a vehicle information database (DB) 42, a common registration point database (DB) 44, and the communication control unit 38.

The vehicle information DB 42 holds identification information that identifies the onboard unit 12 of vehicles registered in advance as vehicle information.

The common registration point DB 44 holds position information and the like of common registration points registered in advance between pre-registered vehicles.

The communication control unit 38 communicates with the onboard unit 12 connected to the network 16 by performing communication with the network 16 via wireless communication using a cellular phone network or the like.

Figure 3:
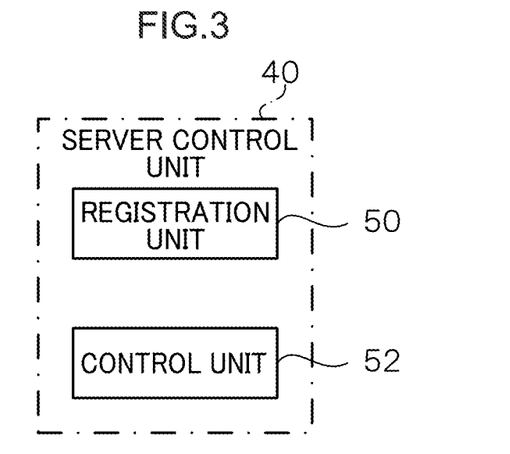
FIG. 3 is a block diagram illustrating functional configuration of a server.

In the present exemplary embodiment, the programs stored in the ROM 40B are executed, thereby functioning as the registration unit 50 and the control unit 52, as illustrated in FIG. 3. FIG. 3 is a block diagram illustrating functional configuration of the server 14.

The registration unit 50 registers in advance vehicles that share position information, and common registration points for the respective vehicles. For example, identification information that identifies the onboard unit 12 of a vehicle that shares position information is registered in the vehicle information DB 42 as vehicle information. Moreover, the vehicle information is registered for respective groups including families, workplaces, or the like. Moreover, settings for the common registration points are received from the onboard unit 12 of respective vehicles and registered in the common registration point DB 44.

The control unit 52 performs control so as to cause the distance from a vehicle registered by the registration unit to a common registration point to be displayed on the monitor 20 installed in the vehicle of a specific member.

In the inter-vehicle distance sharing system 10 configured as described above, the distances of respective vehicles to a pre-registered common registration point is displayed on the monitor 20 of the onboard unit 12 so as to be shared among the pre-registered vehicles. Since the distance between specific registered vehicles (such as a family member or a workplace colleague) is thereby displayed, behavior taking into consideration the location of the other party is enabled.

For example, when a user returns home to attend to a brief matter and parks at a home parking lot at which plural host vehicles can be parked in parallel, with the intention of leaving immediately, if a family member subsequently comes home and parks in front of the first vehicle, troublesome vehicle switching may occur. In such a situation, it is possible to understand the distance to a common registration point of another party that has been registered in advance, enabling one's own plan to be formulated in consideration of the location of the other party.

Next, explanation follows regarding processing according to which the distances of respective vehicles to a pre-registered common registration point are shared between the pre-registered respective vehicles in the inter-vehicle distance sharing system 10 according to the present exemplary embodiment configured as described above.

In the inter-vehicle distance sharing system 10 according to the present exemplary embodiment, the identification information of the onboard unit 12 is registered in advance in the server 14 as vehicle information, and a common registration point for each vehicle is registered in advance in the server 14. Advance registration of vehicle information and common registration points may be performed by operating the onboard unit 12, or may be performed by operating an information processing terminal such as a personal computer or a smartphone.

Figure 4:
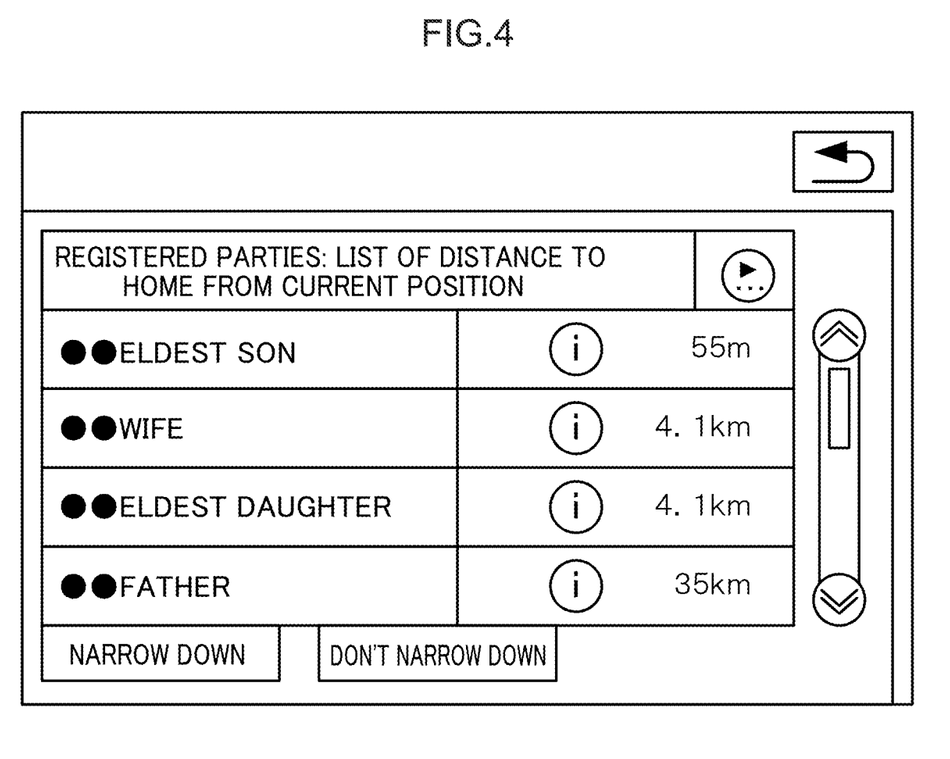
FIG. 4 is a diagram illustrating a display example of a distance from respective vehicles to a common registration point.

In a case in which the server 14 receives a request from the onboard unit 12 to acquire a distance from each vehicle registered with the onboard unit 12 to a common registration point, position information is acquired from each vehicle, and the distance from each vehicle to the common registration point is calculated. Then, the calculated distance from each vehicle to the common registration point is transmitted to the onboard unit 12 of the request source, and displayed on the monitor 20 of the onboard unit 12. For example, as illustrated in FIG. 4, the distance to the common registration point is displayed for each driver of each vehicle. FIG. 4 is a diagram illustrating a display example of a distance from each vehicle to a common registration point.

FIG. 4 shows an example in which the distance to the registration point is 55 m for a vehicle driven by an elder son, 4.1 km for a vehicle driven by a wife, 4.1 km for a vehicle driven by an elder daughter, and 35 km for a vehicle driven by a father. In a case in which "narrow down" illustrated in FIG. 4 is instructed by operating the onboard unit 12, the display is updated by narrowing down under specified conditions. In a case in which "don't narrow down" is instructed, the distances to the common registration points of all the registered vehicles are displayed. Note that as an example of narrowing down under a specified condition, the display is narrowed down to a specified distance, or the display is narrowed down to moving vehicles. Note that not only the distance display but also a map may be displayed to display the respective vehicles on the map.

Note that when displaying the distance from each vehicle to the common registration point, a moving vehicle that has a changing distance, and a stationary vehicle, may be displayed in different display modes (e.g., color, flashing, text thickness, or the like). This enables the distance of each vehicle to the common registration point and the presence or absence of movement to be checked.

In a case in which the vehicle has set the destination of the navigation device to a common registration point, the estimated arrival time may be displayed on the monitor 20 as well. Namely, when the server 14 acquires position information for each vehicle, the server 14 acquires the estimated arrival time from the navigation device, and when transmitting the distance from each vehicle to the common registration point to the request source, the estimated arrival time may also be transmitted and displayed on the monitor 20.

Alternatively, in cases in which a user does not wish to share position information at a certain timing only, the onboard unit 12 may be operated so as to enable the sharing setting for position information to be turned off. For example, in a case in which a user does not wish to share the position information, the sharing setting may be turned off so as to deny the transmission of the position information in response to a position information acquisition request from the server 14.

Next, explanation follows regarding specific processing examples performed by the respective units of the inter-vehicle distance sharing system 10 according to the present exemplary embodiment configured as described above.

Figure 5:
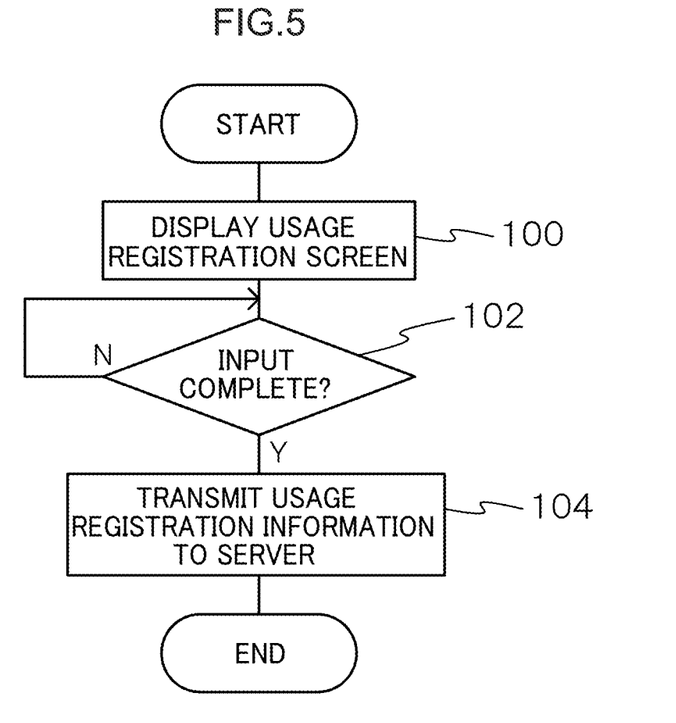
FIG. 5 is a flowchart illustrating an example of a flow of processing performed by an onboard unit when vehicle information and a common registration point are registered.

FIG. 5 is a flowchart illustrating an example of a flow of processing performed by the onboard unit 12 when performing registration of vehicle information and a common registration point. Note that the processing illustrated in FIG. 5 is started when, for example, the operation unit 22 is operated and usage registration is instructed.

At step 100, the CPU 18A displays a predetermined usage registration screen on the monitor 20, and the processing transitions to step 102. The usage registration screen displays, for example, a screen for inputting user information, identification information for the onboard unit 12, and the like. Note that the identification information for the onboard unit 12 may be acquired from the onboard unit 12.

At step 102, the CPU 18A determines whether or not the input to the usage registration screen has been completed. This determination is performed, for example, by the user operating the operation unit 22 to input respective items of the usage registration screen, and then determining whether or not an operation indicating the end of input has been performed. The processing waits until the determination is affirmative, and transitions to step 104.

At step 104, the CPU 18A transmits the input usage registration information to the server 14, and ends the processing performed by the onboard unit 12 during registration.

Figure 6:
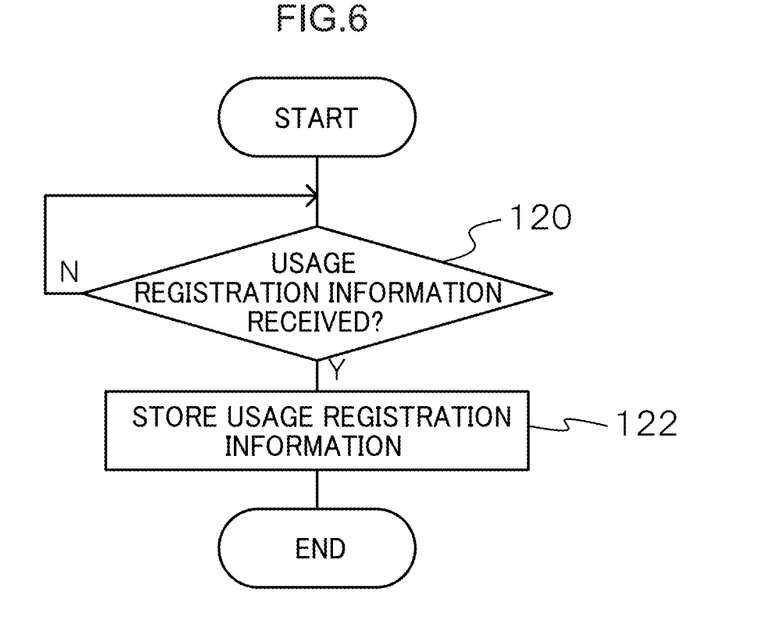
FIG. 6 is a flowchart illustrating an example of a flow of processing performed by a server when vehicle information and a common registration point are registered.

FIG. 6 is a flowchart illustrating an example of a flow of processing performed by the server 14 when performing registration of vehicle information and a common registration point. Note that the processing of FIG. 6 is started in a case in which usage registration information has been transmitted from the onboard unit 12.

At step 120, the CPU 40A waits until the usage registration information transmitted from the onboard unit 12 has been received, and transitions to step 122.

At step 122, the CPU 40A stores the usage registration information received from the onboard unit 12, and ends the processing performed by the server 14 during registration. Namely, the registration unit 50 causes the identification information of the onboard unit 12 to be stored in the vehicle information DB 42 as vehicle information, and causes the common registration point to be stored in the common registration point DB 44.

Next, explanation follows regarding specific processing performed by the inter-vehicle distance sharing system 10 after usage registration has been performed.

Figure 7:
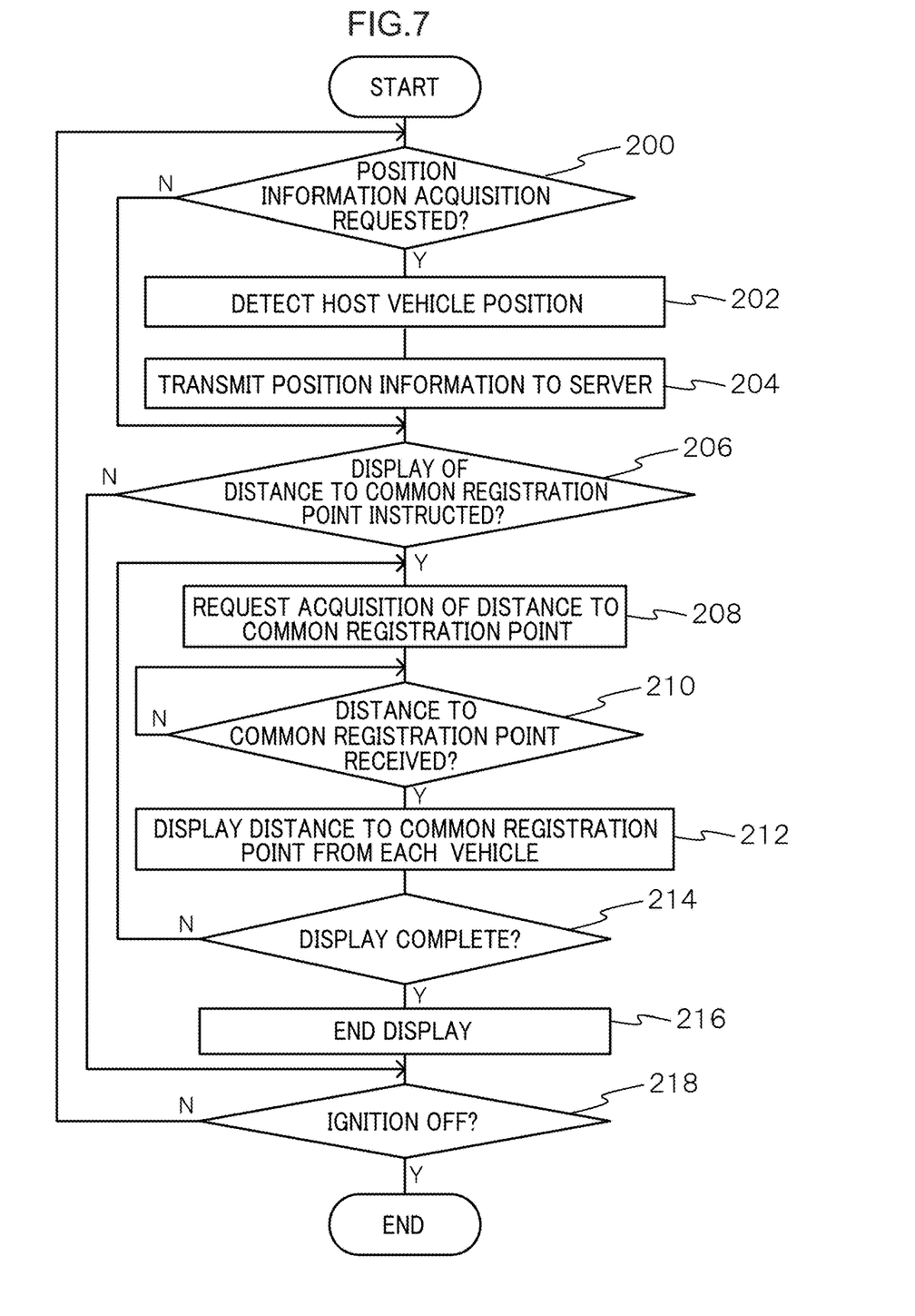
FIG. 7 is a flowchart illustrating an example of a flow of specific processing performed by an onboard unit after usage registration.

FIG. 7 is a flowchart illustrating an example of a flow of specific processing performed by the onboard unit 12 after usage registration. Note that the processing of FIG. 7 is started, for example, when a non-illustrated ignition switch is turned on.

At step 200, the CPU 18A determines whether or not a position information acquisition request has been received from the server 14. In a case in which the determination is affirmative, the flow transitions to step 202, while in a case in which the determination is negative, the flow transitions to step 206.

At step 202, the CPU 18A detects the vehicle position from a reception result of a GPS signal by the GPS receiver 28, and transitions to step 204. Namely, the control unit 18 detects the host vehicle position by locating the host vehicle position based on the reception results of plural GPS signals. When GPS signals cannot be received, the vehicle position is estimated based on the position information detected from the previous GPS signal and the detection results of the vehicle speed sensor 26 and the gyro sensor 30.

At step 204, the CPU 18A transmits the detected position information of the host vehicle to the server 14, and transitions to step 206. When transmitting the position information of the host vehicle to the server 14, the position information is transmitted to the server 14 together with the identification information of the onboard unit 12 so as to enable the vehicle to be identified.

At step 206, the CPU 18A determines whether or not an instruction to display the distance to a common registration point has been issued. This determination is made as to whether or not, for example, a common registration point that has been pre-registered by operating the operation unit 22 has been selected, and an instruction to display the distance of each vehicle to the selected common registration point has been issued. In a case in which the determination is affirmative, the flow transitions to step 208, while in a case in which the determination is negative, the flow transitions to step 218.

At step 208, the CPU 18A requests the server 14 to acquire the distance to the common registration point, and transitions to step 210.

At step 210, the CPU 18A determines whether or not the distance to the common registration point has been received from the server 14. The process waits until the determination is affirmative, and transitions to step 212.

At step 212, the CPU 18A displays on the monitor 20 the distance from each registered vehicle to the common registration point, and transitions to step 214. For example, as illustrated in FIG. 4, the distance to the common registration point is displayed for each driver of each vehicle. This enables the user to understand the distance to the common registration point of another party that has been registered in advance, enabling the user to formulate his/her plan in consideration of the location of the other party.

At step 214, the CPU 18A determines whether or not to end the display. This determination is made, for example, as to whether or not an operation to end display has been performed by the operation unit 22. In a case in which the determination is affirmative, the flow transitions to step 216, while in a case in which the determination is negative, the flow returns to step 208, and the above processing is repeated.

At step 216, the CPU 18A ends the display of the distance from each registered vehicle to the common registration point, and transitions to step 218.

At step 218, the CPU 18A determines whether or not a non-illustrated ignition switch (IG) has been turned off. In a case in which the determination is negative, the flow returns to step 200 to repeat the above processing, and when the determination is affirmative, the series of processing performed by the onboard unit 12 is ended.

Figure 8:
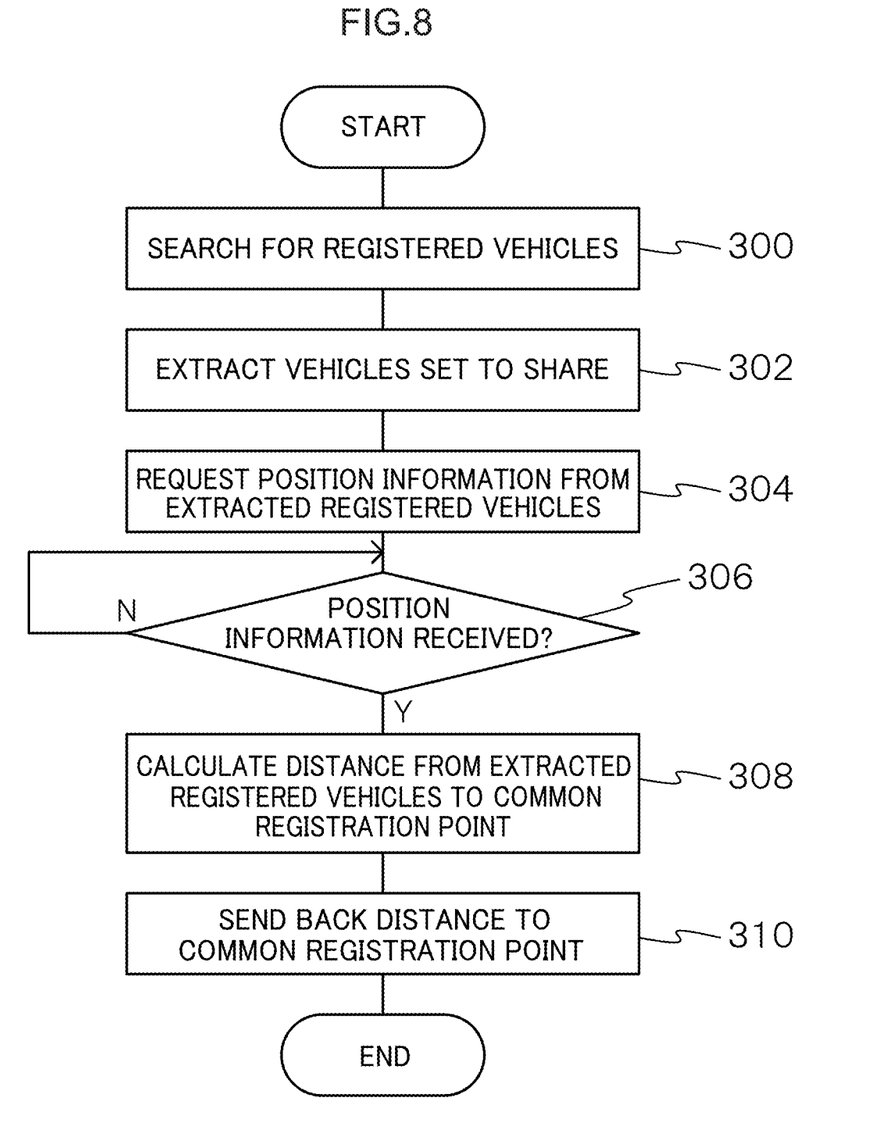
FIG. 8 is a flowchart illustrating an example of a flow of specific processing performed by a server after usage registration.

FIG. 8 is a flowchart illustrating an example of a flow of specific processing performed by the server 14 after usage registration. Note that the processing of FIG. 8 is started in a case in which a request to acquire a distance from the onboard unit 12 to a common registration point is made. The processing illustrated in FIG. 8 is a specific example of processing performed by the control unit 52.

At step 300, the CPU 40A searches for a registered vehicle, and transitions to step 302. Namely, the vehicle information of a group to which the requesting vehicle belongs is searched for from vehicle information registered in advance. For example, in a case in which the positions of family members are requested at the time of request, the vehicle information of family members is searched for.

At step 302, the CPU 40A extracts vehicles that have been set communally, and transitions to step 304. Namely, the onboard unit 12 extracts vehicles for which position information sharing permission has been set. Note that in cases in which the sharing setting functionality is not provided, the processing of step 302 is omitted.

At step 304, the CPU 40A requests acquisition of position information from the extracted registered vehicles, and transitions to step 306. This enables the determination of step 200 described above to be affirmative.

At step 306, the CPU 40A determines whether or not position information has been received from each vehicle. The process waits until the determination is affirmative, and transitions to step 308.

At step 308, based on the received position information, the CPU 40A calculates the distance from the extracted registered vehicles to the common registration point, and transitions to step 310.

At step 310, the CPU 40A returns the distances to the common registration point to the requesting onboard unit 12, and ends the series of processing.

By performing the processing at the respective units in this manner, the distances from the pre-registered vehicles to the common registration point are displayed on the monitor 20 of the onboard unit 12, enabling the positions of the vehicles to be shared and a driving plan to be formulated.

Although an example in which the distance from a pre-registered vehicle to a common registration point is calculated at the server 14 side has been described in the above exemplary embodiment, there is no limitation thereto. For example, the onboard unit 12 may acquire position information for each vehicle from the server 14, and calculate a distance from each vehicle to a common registration point at the onboard unit 12 side.

In the above exemplary embodiment, explanation has been given regarding a case in which, when registering common registration points, for example, family members register common registration points by agreement. The method of registering common registration points is not limited to this. For example, each vehicle may perform point registration with the server 14, and the server 14 may extract a common point registration and set this as a common registration point.

Although explanation has been given regarding processing performed by the respective units of the inter-vehicle distance sharing system 10 in the above exemplary embodiments as software processing performed by executing a program, there is no limitation thereto. Processing may be performed using hardware such as a graphics processing unit (GPU), an application specific integrated circuit (ASIC), or a field-programmable gate array (FPGA). Alternatively, processing may be performed by combining both software and hardware. In cases in which software processing is employed, the programs may be stored and distributed on various non-transitory storage media.

Moreover, the present disclosure is not limited to the above description, and various other modifications may of course be implemented within a range not departing from the spirit of the present disclosure.

What is claimed is:

1. An inter-vehicle distance sharing device, comprising:
a memory; and
a processor coupled to the memory, the processor configured to:
register, in advance, vehicles that share position information, in respective groups, and a common registration point of each of the vehicles; and
in response to a request from a vehicle of the vehicles for the position information,
search for a plurality of vehicles in a group to which the requesting vehicle belongs;
extract the plurality of vehicles in the group set to share the position information;
request acquisition of the position information from each of the plurality of extracted vehicles in the group;
determine whether or not the position information has been received from said each of the plurality of extracted vehicles in the group;
calculate, based on the received position information, a distance from said each of the plurality of extracted vehicles in the group to the common registration point; and
display, at a display unit installed at the requesting vehicle, the distance from said each of the plurality of extracted vehicles in the group to the common registration point.

2. The inter-vehicle distance sharing device of claim 1, wherein
the processor is configured to perform control to display the distance at the display unit with a different display format for a case in which the plurality of extracted vehicles is in motion and the distance changes, and for a case in which the plurality of extracted vehicles is stationary and there is no change in the distance.

3. The inter-vehicle distance sharing device of claim 1, wherein
the processor is configured to perform control to further display, at a display unit, an estimated arrival time in a case in which the requesting vehicle has set the common registration point as a destination.

4. An inter-vehicle distance sharing method executed by a processor, the inter-vehicle distance sharing method comprising:
registering, in advance, vehicles that share position information, in respective groups, and a common registration point of each of the vehicles; and
in response to a request from a vehicle of the vehicles for the position information,
searching for a plurality of vehicles in a group to which the requesting vehicle belongs;
extracting the plurality of vehicles in the group set to share the position information;
requesting acquisition of the position information from each of the plurality of extracted vehicles in the group;
determining whether or not the position information has been received from said each of the plurality of extracted vehicles in the group;
calculating, based on the received position information, a distance from said each of the plurality of extracted vehicles in the group to the common registration point; and
displaying, at a display unit installed at the requesting vehicle, the distance from said each of the plurality of extracted vehicles in the group to the common registration point.

5. A non-transitory storage medium storing an inter-vehicle distance sharing program executable by a processor to perform processing, the processing comprising:
registering, in advance, vehicles that share position information, in respective groups, and a common registration point of each of the vehicles; and
in response to a request from a vehicle of the vehicles for the position information,
searching for a plurality of vehicles in a group to which the requesting vehicle belongs;
extracting the plurality of vehicles in the group set to share the position information;
requesting acquisition of the position information from each of the plurality of extracted vehicles in the group;
determining whether or not the position information has been received from said each of the plurality of extracted vehicles in the group;
calculating, based on the received position information, a distance from said each of the plurality of extracted vehicles in the group to the common registration point; and
displaying, at a display unit installed at the requesting vehicle, the distance from said each of the plurality of extracted vehicles to the common registration point.

* * * * *